May 10, 1960  R. J. WIRSCHING  2,935,878
ANTI-ROTATION PLUNGER ARRANGEMENT FOR INJECTION PUMPS
Filed May 11, 1954

INVENTOR.
ROBERT J. WIRSCHING.
BY Dicke and Craig
ATTORNEYS.

United States Patent Office 2,935,878
Patented May 10, 1960

2,935,878

ANTI-ROTATION PLUNGER ARRANGEMENT FOR INJECTION PUMPS

Robert J. Wirsching, Korntal, Germany, assignor to Daimler-Benz Aktiengesellschaft, Stuttgart-Unterturkheim, Germany Application May 11, 1954, Serial No. 429,033

Claims priority, application Germany May 12, 1953

2 Claims. (Cl. 74—55)

The present invention relates to improvements in injection pumps and more particularly to means for preventing rotary movement of the control rods which are reciprocated by the cam shaft of such pump.

For guiding the control rods of certain designs of injection pumps so as to remain in a proper position relative to the respective cam of the cam shaft reciprocating the same, it is often desirable, or even required, to lock such rods against rotary movement. It has therefore already been proposed to design the adjacent control rods of a multicylinder pump so as to be of such a large diameter that the outer circumferences thereof, when viewed in a cross section, intersect each other, and to cut off the intersecting portions of the adjacent rods so that the flat surfaces then remaining abut and rest on each other and thus prevent any rotary movement of either control rod. Such a design, however, presupposes that the pump cylinders are disposed very closely adjacent each other, and it has been found that such a design, although very suitable for some pumps, cannot be applied in many others where the adjacent pump cylinders must be spaced further apart for any particular reason, such as the provision of certain control elements, conduits, or the like.

It is therefore the object of the invention to realize the advantages of such a locking feature consisting of flat surfaces on the outer periphery of the control rods, even though the adjacent rods are spaced a relatively large distance apart and are thus unable to brace or lock each other against rotation by direct contact with each other.

Another object of the present invention is to provide two adjacent hollow control rods of an injection pump with flat surfaces cut to such a depth as to produce a communicating passage between the inside and outside of the control rods for the air above the pin, guiding these surfaces, to escape towards the inside of the control rods.

A feature of the invention for attaining this object broadly consists in providing two adjacent control rods, which are reciprocated by the cam shaft within cylindrical bores, with a flat surface on the periphery of each rod and with these flat surfaces facing each other, and in providing in the cylinder housing intermediate these control rods and transverse thereto a cylindrical locking pin of a diameter depending upon the distance between the two rods and with diametrically opposed points thereof abutting against the flat surfaces of the adjacent control rods so as to permit the latter to slide in axial direction thereof, while nevertheless being locked against any rotary movement by such intermediate locking pin.

According to a preferred embodiment of the invention, the locking pin is suitably mounted transversely of the control rods so as to be freely rotatable within the cylinder housing and relative to the control rods for reducing the friction between the flat surfaces on these rods and the cylindrical surface of the locking pin.

The provision of such a locking pin has the advantage that by extremely simple and inexpensive means the rotation either of one or of a pair of adjacent control rods is effectively prevented and their proper position relative to the respective cam on the cam shaft is always assured. Thus, a single locking pin may serve to lock two adjacent rods simultaneously against any rotary movement, and the distance between the two rods may be varied simply by providing a pin of suitable diameter intermediate and in contact with the flat surfaces on these rods.

Further objects, features, and advantages of the present invention will appear from the following detailed description and the accompanying drawings, in which Fig. 1 shows a longitudinal section through the control rods of two adjacent cylinders of a multicylinder injection pump with a roller on each rod adapted to rotate on the respective cam of the cam shaft of the pump;

Fig. 4 is a section similar to Fig. 1 through another type of control rod; while

Figure 1:
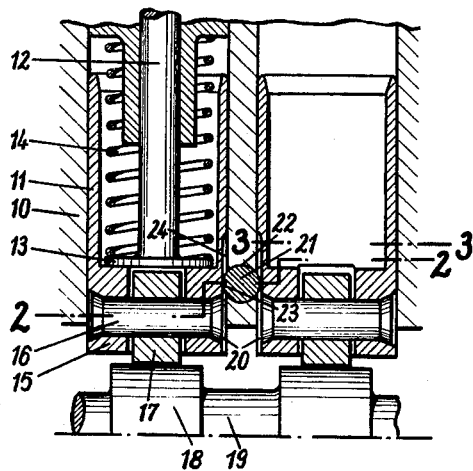
Figure 2:
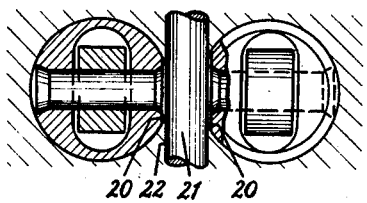
Fig. 2 is a cross section taken along line 2—2 of Fig. 1.

Referring to the drawings, and especially to Figs. 1 and 2 thereof, the pump housing 10 has slidably mounted therein two adjacent control rods 11 for operating the respective pump plungers 12 only one of which has been shown therein. The plunger 12 is forced against the bottom 15 of the hollow control rod 11 by means of a coil spring 14 acting upon a collar 13 on the lower end of the plunger. The bottom portion 15 of each control rod 11 carries a transverse stud 16 on which a roller 17 is rotatably mounted which rests upon the respective cam 18 of the cam shaft 19.

For locking the control rods 11 against rotation, they are provided on their outer periphery with flat surfaces 20 facing each other. A cylindrical locking pin or bolt 21 is fitted into a bore 22 in the housing 10 extending in a direction at a right angle to the axis of the cam shaft 19 so that the control rods 11 of two adjacent pump cylinders are able to slide in a vertical direction along diametrically opposed points of the pin 21 and in linear contact therewith along a line 23. The diameter of the locking pin or bolt 21 depends upon the space provided intermediate the control rods 11, and thus the design of the pump cylinders and the distance between them is not restricted to the particular dimensions as indicated in the drawings.

Figure 3:
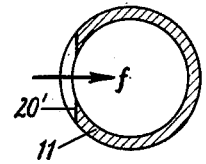
Fig. 3 shows a cross section of a modification similar to Figure 1 in accordance with the invention and taken along a line thereof corresponding to line 3—3 of Fig. 1.

In the embodiment of the invention as shown in Fig. 3, the flat surfaces 20' are cut into the wall of the control rod 11 to such a depth that it is thereby perforated, so that the air in the hollow space 24 above the transverse pin 21 is able to escape toward the inside of the hollow rod 11 in the direction shown by the arrow $f$.

Figure 4:
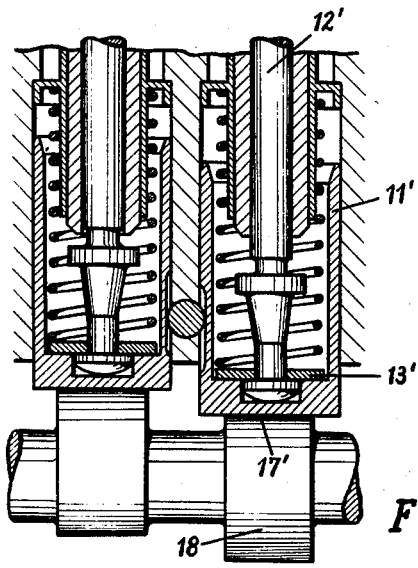

The modification of the invention as shown in Fig. 4 differs from the embodiment shown in Fig. 1 primarily by the fact that the surface of the control rods 11 which are held in contact with the cams 18 is not formed by rollers, as in Fig. 1, but by a flat surface 17' at the lower end of the control rods 11' or a surface which is slightly curved in a direction perpendicular to the plane of the drawing. A further difference resides in the shape of the plungers 12' which are secured within the control rods 11' by washers 13'.

Figure 5:
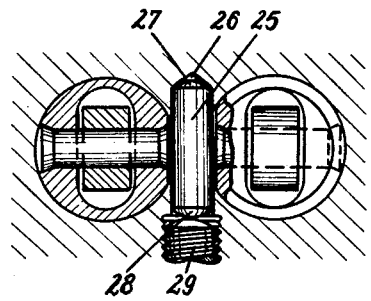
Fig. 5 is another cross section taken along line 2—2 of Fig. 1 through a preferred embodiment of the invention with a locking pin rotatably mounted intermediate the two control rods.

In the preferred embodiment of the invention as shown in Fig. 5, the adjacent control rods 11 are likewise locked against any rotary movement by flat surfaces on the sides facing each other, and a bolt or pin 25 mounted in the pump housing 10 intermediate such surfaces and in linear contact therewith. However, in this embodiment the bolt or pin 25 is rotatably mounted in the bore 26 in the pump housing 10 so as to reduce the friction between the flat surfaces 20 and the pin 25. For this purpose, the bolt or pin 25 is provided with rounded ends 27 and 28 and is loosely retained in the bore 26 by means of a screw 29.

In operating a multicylinder injection pump provided with the features according to the invention the two adjacent control rods of each pair may thus not only slide along the pin 25 so as to lock them against any rotational movement but also through the rotatable mounting of the pin 25 they will be able to roll along the pin which will thereby be rotated at least to some extent. Such rotary movement of the pin 25 and such rolling contact between the pin and the flat surfaces 20 of the control rod will not only considerably reduce the friction between these elements but, especially if between the control rods and the pin 25 conventional lubricating means are provided, such rolling contact will automatically provide an oil film on the cooperating surfaces of the pin and the flat surfaces and thus practically prevent any wear thereon.

Although when describing the embodiments of the invention shown in Figs. 1 to 4 no special mention has been made of the rotatable mounting of the locking pin, it is obvious that it may also be applied thereto.

Even though the rotatable form of locking pin has been found the most suitable, I do not wish to be limited thereto. Also, although a cylindrical pin will usually be the most suitable insofar as the construction and installation thereof, as well as the minimum amount of friction caused thereby is concerned, the invention should not be regarded as being limited thereto inasmuch as any other shape of pin, for example, a polygonal shape, may be used.

Having thus described my invention in detail, what I claim as new is:

1. In an injection pump having a housing, at least two adjacent plungers, at least two hollow-shaped control rods having outer walls and slideably mounted within said housing and operatively connected with said plungers, respectively, a camshaft having at least two cams thereon being in contact with said control rods respectively for reciprocating said plungers, and means for locking both of said control rods simultaneously against rotational movement, said means comprising a substantially flat outer surface on each of said rods, said surfaces facing each other in the direction of a tangential plane lying between both rods and only extending along a part of the length of said rods, and a pin mounted within said housing between said control rods extending at right angle to the direction of movement of said rods and within said plane and substantially in contact with said flat surfaces, each flat surface interrupting the outer wall of the hollow control rod of which it forms part so as to provide a communicating opening between the inside of said control rod and the chamber formed between the flat surface and the adjacent wall of the pump housing above said pin.

2. In an injection pump having a housing, at least two adjacent plungers, at least two hollow-shaped control rods defined by outer walls and slideably mounted within said housing and operatively connected with said plungers respectively, a cam-shaft having at least two cams thereon being in contact with said control rods respectively for reciprocating said plungers, and means for locking both of said control rods simultaneously against rotational movement, said means comprising a substantially flat outer surface on each of said rods, said surfaces facing each other in the direction of a tangential plane lying between both rods and only extending along a part of the length of said rods, and a pin rotatably mounted within said housing intermediate said control rods extending at right angle to the direction of movement of said rods and within said plane and substantially in contact with both of said flat surfaces, each flat surface interrupting the outer wall of the hollow control rod of which it forms part so as to provide a communicating opening between the inside of said control rod and the chamber formed between the flat surface and the adjacent wall of the pump housing above said pin.

References Cited in the file of this patent

UNITED STATES PATENTS

| | | |
|---|---|---|
| 2,131,779 | Zwick | Oct. 4, 1938 |
| 2,276,630 | Sheppard | Mar. 17, 1942 |
| 2,520,453 | Burmist | Aug. 29, 1950 |

FOREIGN PATENTS

| | | |
|---|---|---|
| 426,393 | Great Britain | Mar. 29, 1935 |
| 810,210 | Germany | Aug. 6, 1951 |
| 828,325 | Germany | Jan. 1, 1952 |
| 828,326 | Germany | Jan. 17, 1952 |